United States Patent
Heeter et al.

(10) Patent No.: US 11,635,026 B1
(45) Date of Patent: Apr. 25, 2023

(54) FAN CASE ASSEMBLY FOR A GAS TURBINE ENGINE

(71) Applicant: ROLLS-ROYCE DEUTSCHLAND LTD & CO KG, Blankenfelde-Mahlow (DE)

(72) Inventors: Robert W. Heeter, Noblesville, IN (US); Dennes K. Burney, Indianapolis, IN (US); Jonathan M. Rivers, Indianapolis, IN (US)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 17/721,779

(22) Filed: Apr. 15, 2022

Related U.S. Application Data

(60) Provisional application No. 63/292,070, filed on Dec. 21, 2021.

(51) Int. Cl.
  *F02C 7/24* (2006.01)
  *F01D 25/24* (2006.01)

(52) U.S. Cl.
  CPC .............. *F02C 7/24* (2013.01); *F01D 25/24* (2013.01); *F05D 2220/32* (2013.01); *F05D 2240/14* (2013.01); *F05D 2260/96* (2013.01)

(58) Field of Classification Search
  CPC ........ F02C 7/24; F01D 25/24; F05D 2240/14; F05D 2260/96
  See application file for complete search history.

(56) References Cited

U.S. PATENT DOCUMENTS

| | | | | |
|---|---|---|---|---|
| 5,775,095 A * | 7/1998 | Zysman | ................... | F02K 1/48 60/262 |
| 7,337,875 B2 * | 3/2008 | Proscia | ................... | F02C 7/24 181/290 |
| 7,604,095 B2 * | 10/2009 | Mitchell | ................. | F01D 25/30 181/290 |
| 7,784,283 B2 * | 8/2010 | Yu | ............................ | F02K 1/04 60/770 |
| 7,819,224 B2 * | 10/2010 | Borchers | .................. | F02C 7/24 181/292 |
| 2011/0108357 A1 * | 5/2011 | Vauchel | .................. | F02K 1/827 181/222 |
| 2011/0138769 A1 * | 6/2011 | Costa | ..................... | F01D 25/24 415/173.1 |
| 2013/0111906 A1 * | 5/2013 | Bouchard | ................ | F02C 7/24 60/694 |

* cited by examiner

*Primary Examiner* — Igor Kershteyn
(74) *Attorney, Agent, or Firm* — Shuttleworth & Ingersoll, PLC; Timothy J. Klima

(57) ABSTRACT

Aspects of the disclosure regard a fan case assembly for a gas turbine engine, the fan case assembly comprising a fan case having an inner surface and an outer surface, a front acoustic panel having an outer surface, and attachment means attaching the front acoustic panel outer surface to the fan case inner surface. The attachment means comprise a sliding arrangement allowing the front acoustic panel to be slid axially into the fan case. The sliding arrangement comprises a first longitudinal member and a second longitudinal member, one of the members being attached to the fan case inner surface and the other member being attached to the front acoustic panel outer surface. The attachment means further comprise removable fastening means fixing the first longitudinal member and the second longitudinal member in the axial direction.

23 Claims, 13 Drawing Sheets

FAN CASE ASSEMBLY FOR A GAS TURBINE ENGINE

This application claims priority to U.S. Provisional Patent Application 63/292,070 filed Dec. 21, 2021, the entirety of which is incorporated by reference herein.

The present disclosure relates to a fan case assembly for a gas turbine engine.

Gas turbine engines comprise a generally cylindrical fan case which encloses a fan driven by a core engine of the gas turbine engine. Fan case liners are attached to an inner surface of the fan case. Such fan case liners may include a front acoustic panel, a fan track liner and a rear acoustic panel. The fan track liner comprises an abradable surface adjacent the rotor blades. The front and rear acoustic panels provide honeycomb structures for noise mitigation.

The front acoustic panel requires good attachment to and support by the fan case while there is a desire to also maximize the treatment area and minimize weight and cost. Movement in operation which could cause fretting and wear against the fan case is to be avoided. In general, for proper securing of a front acoustic panel there must be retention that prevents motion in the axial, radial, and circumferential directions.

There are two primary options for attachment of a front acoustic panel to a fan case, namely, bonding and bolting. Bonded panels, however, are problematic to replace as they need to be destructively removed, leading to long-term costs and logistical challenges. Such disadvantage is not present with bolted panels. In addition to the ease of replacement of a damaged panel, bolted panels permit the panels to be removed to remove the fan rotor in case it is of a trapped design (such that blade diameter is greater than the smallest diameter of the acoustic panel forward of it).

There is a desire to further improve fan case assemblies in providing a secure attachment of a front acoustic panel to the fan case. Additionally, allowing for a large acoustically treated area and improving ease of repair of the acoustic panel may also be desirable.

According to an aspect of the invention, a fan case assembly for a gas turbine engine is provided. The fan case assembly comprises a fan case having an inner surface and an outer surface, a front acoustic panel having an outer surface, and attachment means attaching the front acoustic panel outer surface to the fan case inner surface. The attachment means comprise a sliding arrangement allowing the front acoustic panel to be slid axially into the fan case. The sliding arrangement comprises a first longitudinal member and a second longitudinal member with cross sections corresponding to each other, one of the members being attached to the fan case inner surface and the other member being attached to the front acoustic panel outer surface. The attachment means further comprise removable fastening means fixing the first longitudinal member and the second longitudinal member in the axial direction.

Aspects of the invention are thus based on the idea to provide for a sliding arrangement to attach the front acoustic panel to the fan case. A sliding arrangement has one degree of freedom of movement only, namely, in the longitudinal direction. Accordingly, by using a sliding arrangement, the front acoustic panel is inherently both radially and circumferentially fixed. To fix the sliding arrangement in the axial direction as well, removable fasteners are implemented. Movement of the front acoustic panel in the radial, circumferential, and axial directions is thus effectively inhibited.

Further advantages are associated with such concept. By avoiding zones of the front acoustic panel which implements radial bolting and aft potting, the treated acoustic area can be maximized. In particular, the presence of cup washers in state-of-the-art bolting zones breaks-up the circumferential noise treatment and makes such zones of the front acoustic panel unusable for noise abatement. Further, removal of the removable fastener allows to disassemble the front acoustic panel and move it in the axial direction after unfastening in case it has been damaged or for removing the fan rotor in an easy manner. Still further, weight and cost can be minimized by removing potting and reinforcement to the extent possible.

In an embodiment, the sliding arrangement comprises a dovetail or Picatinny rail as first longitudinal member and a corresponding slider element as second longitudinal member. Linear relative movement is allowed but a radial and circumferential movement is inhibited due to form-fit between the first and second longitudinal members in these directions.

Dovetail rails and Picatinny rails (wherein so called Weaver rails are considered a variant of Picatinny rails) are well known in the art and provide for well suited sliding arrangements. However, it is pointed out that dovetail rails or Picatinny rails represent example embodiments of the sliding arrangement only. Any rail form and corresponding slider form that allows for linear movement and inhibits radial and circumferential movement is suitable for implementing the sliding arrangement.

In an embodiment, an axial row of screws or rivets extends from the fan case outer surface radially inward, the screws or rivets securing one of the longitudinal members to the fan case inner surface. Accordingly, in this embodiment, multiple screws or rivets are used for connecting one of the longitudinal members to the fan case inner surface, In an embodiment, the rail is attached to the fan case inner surface. Alternatively, the slider member is attached to the fan case inner surface.

In a further embodiment, the rail is attached to or formed in one piece with the front acoustic panel outer surface. Such attachment can be provided by means of bonding or by encapsulation of a portion of the rail with covering plies. In case the rail and the front acoustic outer surface are formed in one piece, this may be achieved by building up plies on the outer surface and machine the rail into the composite material.

In a further embodiment, the slider element is attached to the front acoustic panel outer surface. This may be implemented by means of bonding or by encapsulation of a portion with covering plies.

It may be provided that the first longitudinal member and/or the second longitudinal member comprise serrated or separated portions spaced in the axial direction. Accordingly, one or each longitudinal member may be non-uniform in the axial direction, with the longitudinal member forming axial portions which realize the interlocking with the respective other longitudinal member. In-between-sections between such portions may serve to attach the longitudinal member to the fan case or the front acoustic panel. If the different portions are completely separate, they need to be aligned in the axial direction and be attached separately with the fan case or the front acoustic panel.

As discussed, the sliding arrangement provides for an easy assembly of the front acoustic panel with the fan case, wherein the front acoustic panel can be slid next to the front acoustic panel in the axial direction, such assembly inherently providing for a radial and circumferential fixation of the front acoustic panel. However, in addition the front acoustic panel needs to be fixed in the axial direction after the front acoustic panel has been slid into place. To this end, removable fastening means are provided. The fastening means are removable to allow disassembly of the front acoustic panel without destroying the front acoustic panel.

A plurality of embodiments exist to fix the sliding arrangement axially. In one embodiment, the removable fastening means comprise a radial bolt or pin extending radially inwards from the fan case into through holes in the longitudinal members. This embodiment is particularly useful in case a slider is attached to the fan case and a rail is attached to the front acoustic panel outer surface. The radial bolt or tight fit pin limits any axial motion.

In another embodiment, the removable fastening means comprise fasteners fastening an aft flange of the front acoustic panel to the fan case. Such fasteners may be radial screws. This provides for a simple means of fixity, wherein such a solution may be preferred if the space/zone in which the radial screws are implemented is not to be used for acoustic treatment anyway, such as for casing stiffness or structural strength or due to ice impact concerns.

In still another embodiment, the fan case further comprises a C-rail at the front end of the fan case. Such C-rail may be provided for structural integrity. In such case, the removable fastening means may comprise a radial screw that radially extends at least through a hole in the upper portion of the C-rail and the front ends of the longitudinal members. The screw may further extend radially through the panel.

In still another embodiment, the removable fastening means comprise a bolt, screw or pin extending tangentially from the slider element into the rail. To this end, axially spaced through holes may be provided in the slider element, wherein bolts, screws or pins extend through the through holes into the rail (namely, into cross slots or other cross openings in the rail).

In still another embodiment, the removable fastening means comprise a stop element secured to the fan case adjacent to the front end of the front acoustic panel. Such stop element which is put into place after the assembly of the front acoustic panel inhibits further axial movement. In embodiments, such stop element may be provided by a clevis pin or a threaded end block.

In embodiments, the front acoustic panel comprises a plurality of panel members each extending over a defined angle in the circumferential direction, the panel members being arranged adjacent to one another to form a substantially complete ring of the acoustic panel, and each panel member having first and second edges extending axially and spaced apart in the circumferential direction. In embodiments, there are provided between three to five panel member which form the front acoustic panels. For each panel member, there may be provided between three and five sliding arrangements and axial fastening means to attach the respective panel member to the fan case.

In principle, and in particular when having a small diameter gas turbine engine, the front acoustic panel may be of one piece as well. In such case, a plurality of sliding arrangements spaced in the circumferential direction are used to attach the front acoustic panel to the fan case.

In a further aspect of the invention a fan case assembly for a gas turbine engine is provided, the fan case assembly comprising: a fan case having an inner surface and an outer surface, and a front acoustic panel having an outer surface. The front acoustic panel comprises a plurality of panel members each extending over a defined angle in the circumferential direction, the panel members being arranged adjacent to one another to form a substantially complete ring of the acoustic panel, and each panel member having first and second edges extending axially and spaced apart in the circumferential direction. The first and second edges may also be referred to as circumferential ends. The first and second edges naturally extend in the radial direction, wherein they extend from the front acoustic panel inner surface to the front acoustic panel outer surface. Accordingly, each edge comprises a radially outer end at the front acoustic panel outer surface and adjacent the fan case inner surface.

It is further provided that each panel member comprises a first flange at the radially outer end of the first edge and a second flange at the radially outer end of the second edge, wherein the first flange is radially offset to the second flange. This leads to the situation that in the assembled state (when the panel members are adjacent to each other) the first flange of one panel member and the second flange of the other panel member overlap in the circumferential direction. An axial row of radially extending bolts or screws is provided which secures the first and second flanges of adjacent panel members with each other and with the fan case, wherein the bolts or screws extend through the first and second flanges and the fan case.

This aspect of the invention also provides for fastening of the front acoustic panel to the fan case in a manner that movement of the front acoustic panel in the radial, circumferential, and axial directions is effectively inhibited. The concept is based on overlapping panels, wherein flanges which provide for the overlap are connected with each other and the fan case. As the panel elements are connected to the fan case along their edges, it may be provided for that the panel elements are stiff enough to act as a full hoop after installation. Alternatively, a secondary means of attachment may be provided for such as the sliding arrangements discussed above.

In an embodiment, the radial offset of the first flange with respect to the second flange is equal to the height of the first flange. This allows the first flange and the second flange to be adjacent to each other in the radial direction (without any need for washers).

In an embodiment, the first and second edges of each panel member are chamfered or have a square cut-out towards the acoustic panel member outer surface. This provides for sufficient space between adjacent panel members to provide for bolts or screws and supporting members.

For example, in an embodiment, axially spaced nutplates are riveted or bonded on the radial inner side of the second flange, the nutplates accommodating the bolts or screws.

In an embodiment, through holes are comprised in the first flange and in the second flange which are aligned in the fully installed state, wherein the walls or screws extend through the through holes.

In a still further aspect of the invention a fan case assembly for a gas turbine engine is provided, the fan case assembly comprising: a fan case having an inner surface and an outer surface, and a front acoustic panel having an outer surface. The front acoustic panel comprises a plurality of panel members each extending in the circumferential direction, the panel members being arranged adjacent to one another to form a substantially complete ring of the acoustic panel, and each panel member having first and second edges extending axially and spaced apart in the circumferential direction, each edge having a radially outer end at the front acoustic panel outer surface and adjacent the fan case inner surface, and each edge forming at the radially outer end a protrusion extending in the circumferential direction.

The fan case assembly further comprises attachment means attaching the front acoustic panel outer surface to the fan case inner surface. The attachment means comprise a sliding arrangement allowing the front acoustic panel to be slid axially into the fan case, wherein the sliding arrangement comprises beams attached to the fan case inner surface, each beam extending axially at a circumferential position that lies between two adjacent panel members and each beam forming two axially extending grooves. The sliding arrangement further comprises the protrusions formed at the panel member edges outer end, wherein each protrusion is arranged in a beam groove.

This aspect of the invention implements a sliding arrangement that comprises panel member circumferential protrusions that are arranged in grooves formed by beams.

The beams may be T-shaped beams or an I-shaped beams.

The first and second edges of each panel member may be chamfered or have a square cut-out towards the acoustic panel member outer surface.

The attachment means may further comprise removable fastening means fixing the protrusions and the beams in the axial direction.

In a further aspect of the invention a gas turbine engine for an aircraft is provided which comprises:
   an engine core comprising a turbine, a compressor, and a core shaft connecting the turbine to the compressor;
   a fan located upstream of the engine core, the fan comprising a plurality of fan blades;
   a planetary gearbox that receives an input from the core shaft and outputs drive to the fan so as to drive the fan at a lower rotational speed than the core shaft; and
   a fan case assembly in accordance with the present invention, wherein the fan is enclosed by the fan case assembly.

In an embodiment, it is provided that
   the turbine is a first turbine, the compressor is a first compressor, and the core shaft is a first core shaft;
   the engine core further comprises a second turbine, a second compressor, and a second core shaft connecting the second turbine to the second compressor; and
   the second turbine, second compressor, and second core shaft are arranged to rotate at a higher rotational speed than the first core shaft.

It should be noted that the present invention is described in terms of a cylindrical coordinate system having the coordinates x, r and p. Here x indicates the axial direction, r the radial direction and p the angle in the circumferential direction. The axial direction is defined by the machine axis of the gas turbine engine in which the present invention is implemented, with the axial direction pointing from the engine inlet to the engine outlet. Starting from the x-axis, the radial direction points radially outwards. Terms such as "in front of", "forward", "behind", "rearward" and "aft" refer to the axial direction or flow direction in the engine. Terms such as "outer" or "inner" refer to the radial direction.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear.

The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity Utip. The work done by the fan blades 13 on the flow results in an enthalpy rise dH of the flow. A fan tip loading may be defined as dH/Utip2, where dH is the enthalpy rise (for example the 1-D average enthalpy rise) across the fan and Utip is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being Jkg-1K−1/(ms-1)2). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 Nkg-1 s, 105 Nkg-1 s, 100 Nkg-1 s, 95 Nkg-1 s, 90 Nkg-1 s, 85 Nkg-1 s or 80 Nkg-1 s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fiber. By way of further example at least a part of the fan blade and/or aerofoil may be manufactured at least in part from a metal, such as a titanium based metal or an aluminum based material (such as an aluminum-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fiber or aluminum based body (such as an aluminum lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

The invention will be explained in more detail on the basis of exemplary embodiments with reference to the accompanying drawings in which.

Figure 1:
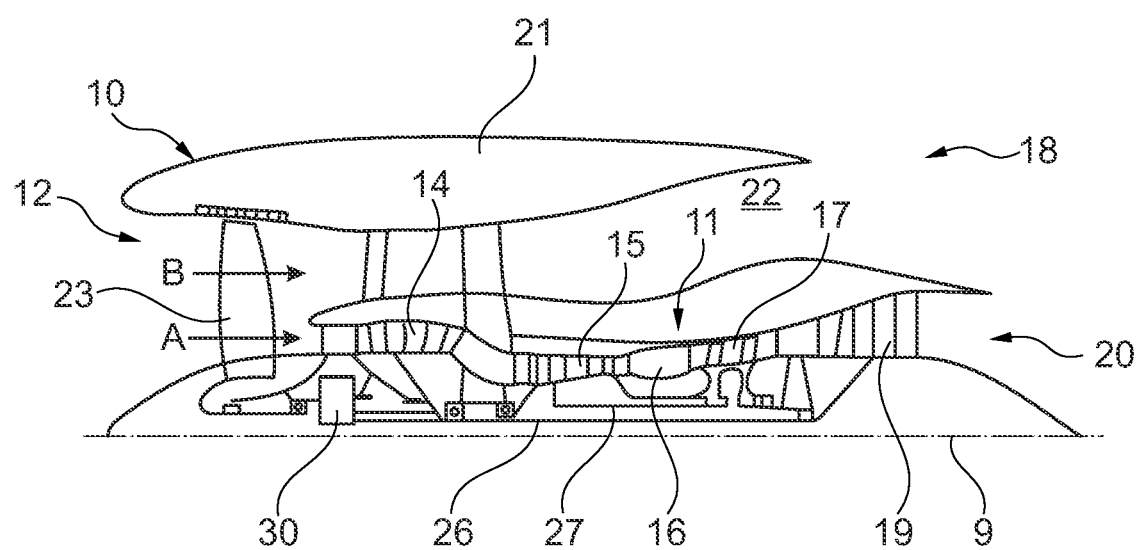
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclical gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclical gearbox 30 is a reduction gearbox.

Figure 2:
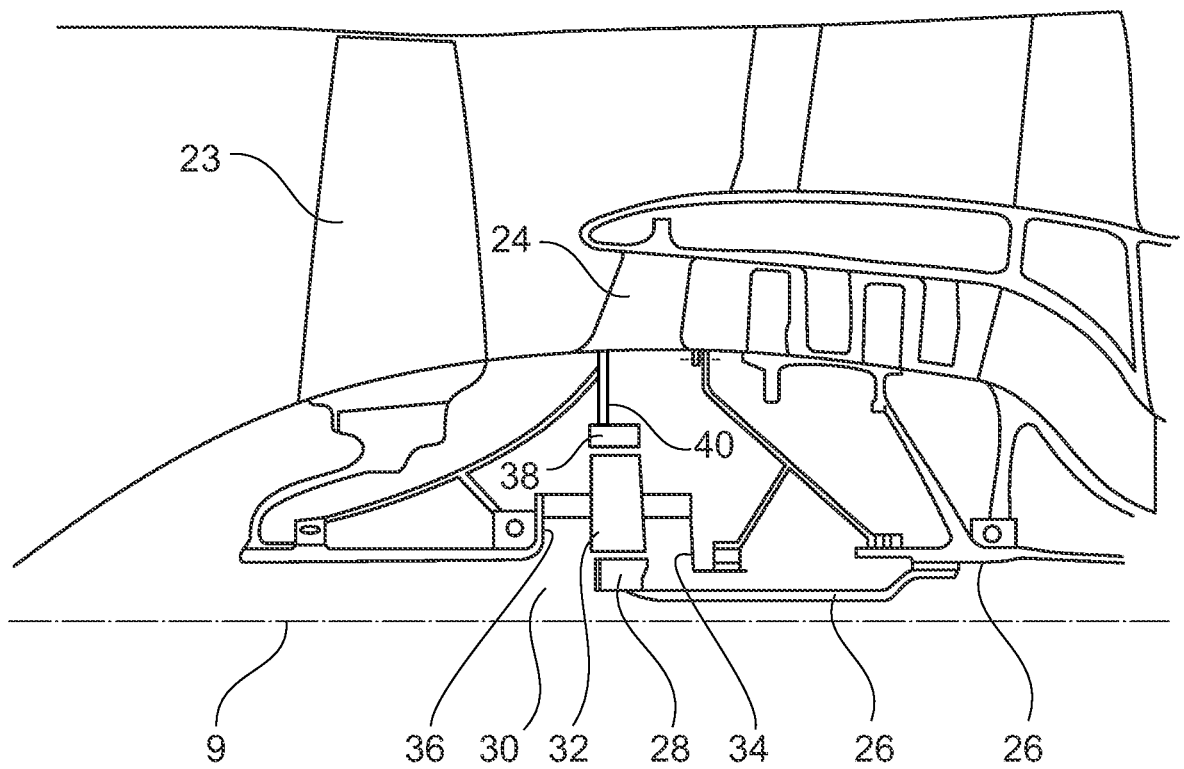
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclical gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
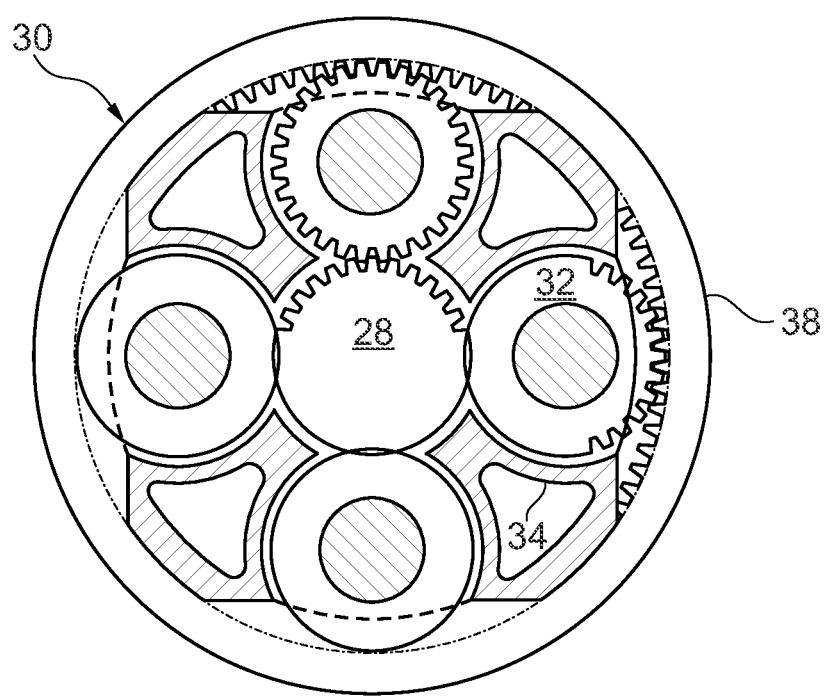
FIG. 3 is a partially cut-away view of a gearbox for a gas turbine engine.

The epicyclical gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclical gearbox 30 generally comprise at least three planet gears 32.

The epicyclical gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclical gearbox 30 may be used. By way of further example, the epicyclical gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. Byway of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

In the context of this invention, the design of a fan case assembly enclosing the fan 23 is of relevance. It is pointed out that the fan case assembly that will be discussed in the following may be implemented in a geared turbofan engine as discussed with respect to FIGS. 1 to 3 but may generally be implemented in any gas turbine engine. The principles of the present invention are not dependent on a particular kind of gas turbine engine.

More particularly, a particularly useful application lies with Civil Small and Medium Engines which may have a fan diameter in the range between 35 to 55". The rotational speed of the fan of such Civil Small and Medium Engines may be in the range between 5000 and 9000 rpm at Maximum Takeoff Thrust.

Figure 4:
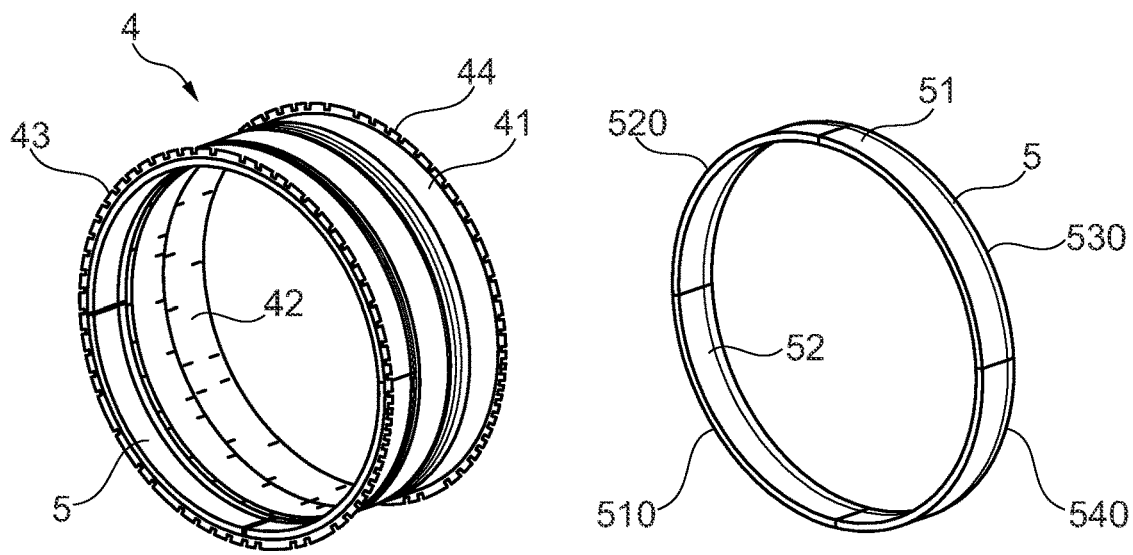
FIG. 4 is an embodiment of a fan case assembly and a front acoustic panel.

FIG. 4 shows an embodiment of a fan case assembly comprising a fan case 4 and a front acoustic panel 5. The front case 4 and front acoustic panel 5 circumferentially surround a fan (not shown) of a gas turbine engine in a manner known to the skilled person. The fan case 4 comprises a radially outer side and a radially inner side which are referred to as outer surface 41 and inner surface 42. The fan case 4 further comprises a front end 43 and an aft end 44.

Front acoustic panel 5 is enclosed by the fan case 4 and attached to the inner surface 42 of the fan case 4 in a front section of the fan case 4 and forward to the fan blades of the fan. It comprises a radially outer side and a radially inner side which are referred to as outer surface 51 and inner surface 52. Further, in the depicted embodiment, the front acoustic panel 5 comprises four panel members 510-540 each extending in the circumferential direction, wherein the panel members 510-540 are arranged adjacent to one another to form substantially completed ring of the acoustic panel 5. It is to be noted that the number of four panel member is an example only and the number may differ substantially and be in the range between three and five panel members depending, among others, on the size of the gas turbine engine.

The fan case 4 may comprise further fan case liners such as a fan track liner and a rear acoustic panel which, however, are not relevant in the context of the present invention and not shown in the figures.

Figure 5:
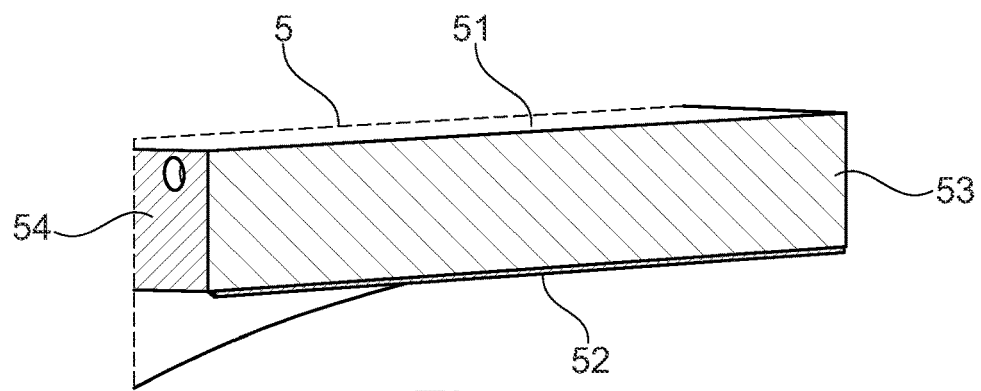
FIG. 5 is an embodiment of a front acoustic panel with a view in the circumferential direction.
Figure 6:
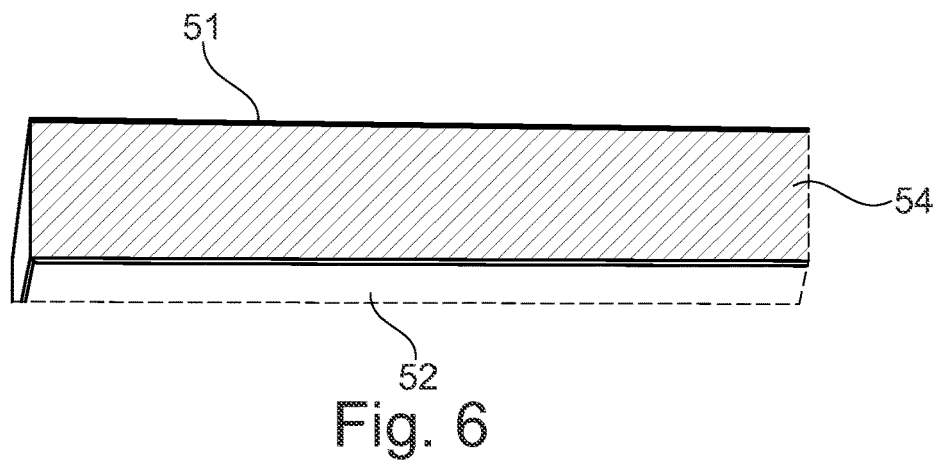
FIG. 6 shows the embodiment of FIG. 5 with a view in the axial direction.

FIGS. 5 and 6 show with a perspective view mostly in the circumferential direction (FIG. 5) and mostly in the axial direction (FIG. 6) the typical structure of a front acoustic panel 5, the front acoustic panel 5 comprising an outer surface 51 formed by an outer skin, an inner surface 52 formed by an inner skin, circumferential end caps 53, one of which can be seen in FIG. 5, and a panel core 54 which is made of a honeycomb material such as an aluminum honeycomb.

The outer surface 51 and the inner surface 52 may be both made of glass fiber reinforced plastic, wherein the inner surface 52 is typically thicker to withstand ice impacts. The end caps 53 may also be made of glass fiber reinforced plastic. The axial ends of the honeycomb core 54 may be closed out with either a foaming film adhesive (also known as core splice) or an epoxy void filling compound. The aluminum honeycomb core 54 and the inner and outer surface/skin 51, 52 may be bonded with a film adhesive.

Figure 7:
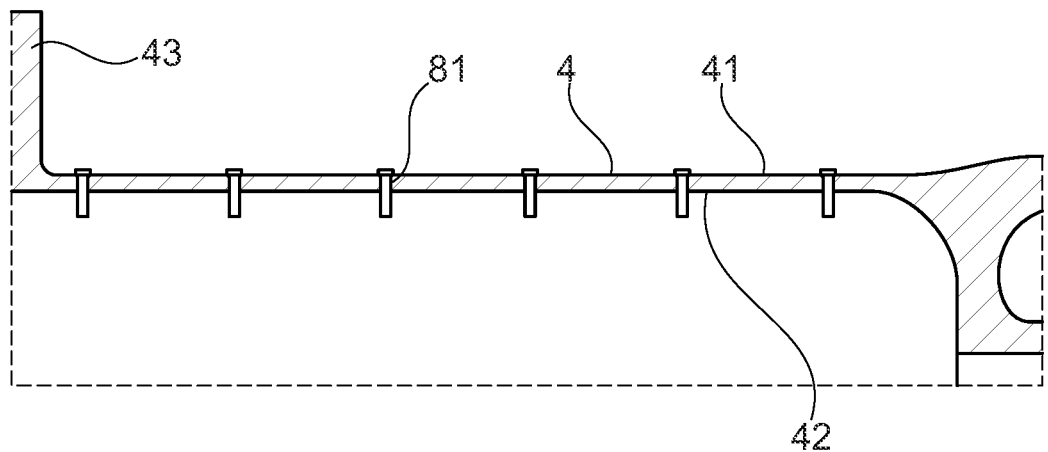
FIG. 7 is an embodiment of a fan case assembly comprising an axial row of screws.
Figure 8:
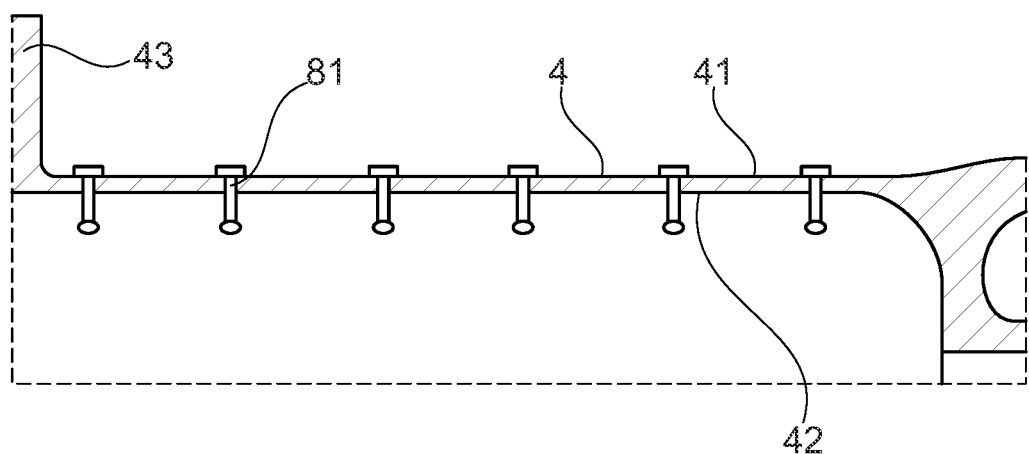
FIG. 8 is an embodiment of a fan case assembly comprising an axial row of rivets.

FIG. 7 depicts a row of axial screws 81 extending through the fan case 4 from the outer surface 41 to the inner surface 42 and standing off from the inner surface 42. FIG. 8 depicts a similar arrangement, wherein rivets 82 are used instead of the screws 81. The screws 81 or rivets 82 server to attach a longitudinal member of a sliding arrangement as will be discussed next.

Figure 9:
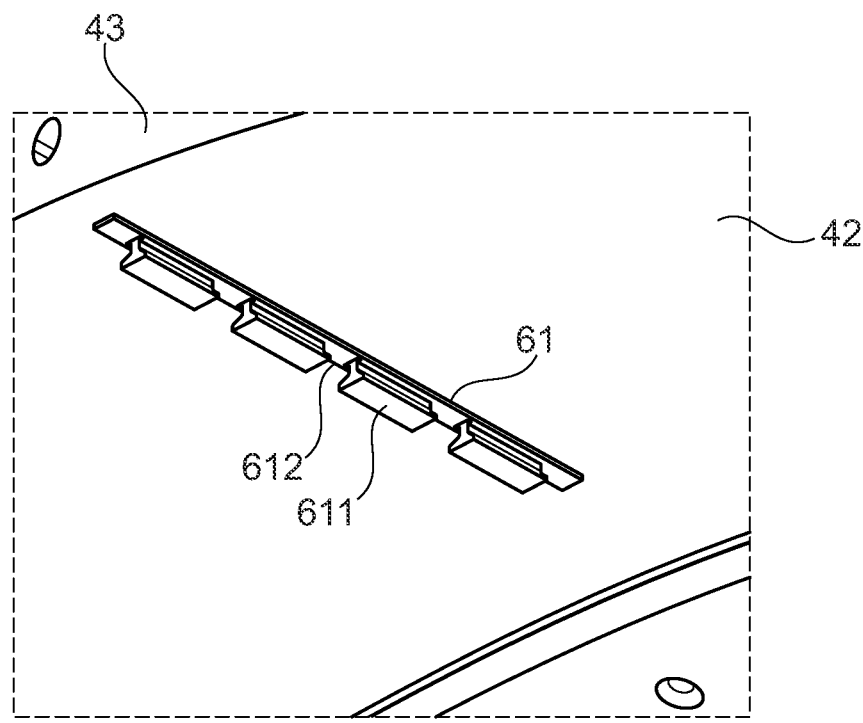
FIG. 9 is an embodiment of a dovetail rail connected to the inner surface of a fan case.

FIG. 9 shows a longitudinal member 61 attached to the inner surface 42 of a fan case 4 by means of a row of screws or rivets in the manner shown in FIGS. 7 and 8. The longitudinal member is formed by a dovetail rail 61, wherein the dovetail rail 61 comprises a plurality of dovetail-shaped portions 611 which are spaced in the axial direction. In the areas 612 in between, the dovetail rail 61 is connected by means of the screws or rivets to the fan case 4.

The dovetail rail 61 represents one longitudinal member of a sliding arrangement which comprises a further longitudinal member sliding along the dovetail rail 61 as will be discussed with respect to FIGS. 11 and 12, wherein the first longitudinal member and the second longitudinal member comprise at least partly corresponding cross-sections which allow for a longitudinal relative movement while fixing the first longitudinal member and the second longitudinal member in the radial and circumferential directions.

Figure 10:
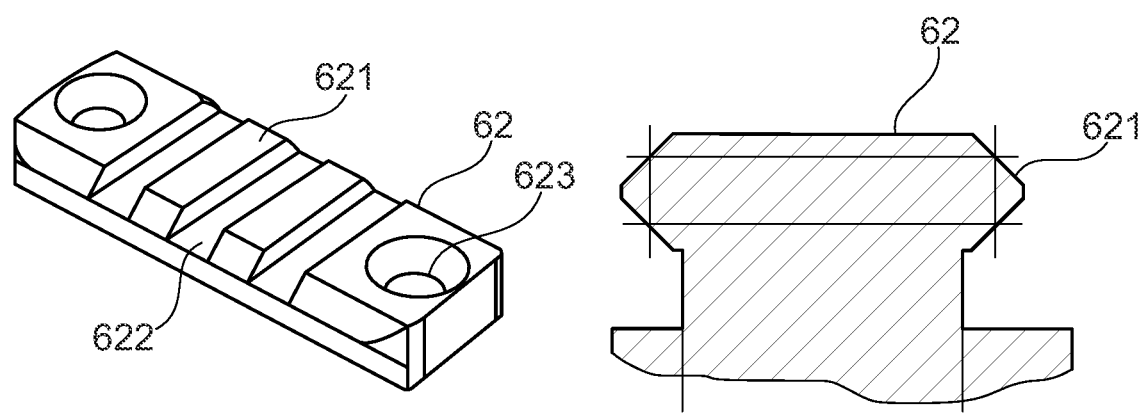
FIG. 10 shows a perspective and a sectional view of a Picatinny rail used alternatively as rail in the embodiment of FIG. 9.

FIG. 10 shows in a perspective and a cross-sectional view an alternative embodiment of a longitudinal member formed by a rail. In FIG. 10, the rail is formed as a Picatinny rail 62 which comprises a hexagonal top cross-section 621 with cross slots 622 in between. The Picatinny rail 62 also comprises attachment holes 623. The length of the rail 62 depicted in FIG. 10 is exemplary only. The length of the rail 62 may be longer. Also, several portion of smaller length may be arranged one behind the other in the axial direction forming a longer rail.

Figure 11:
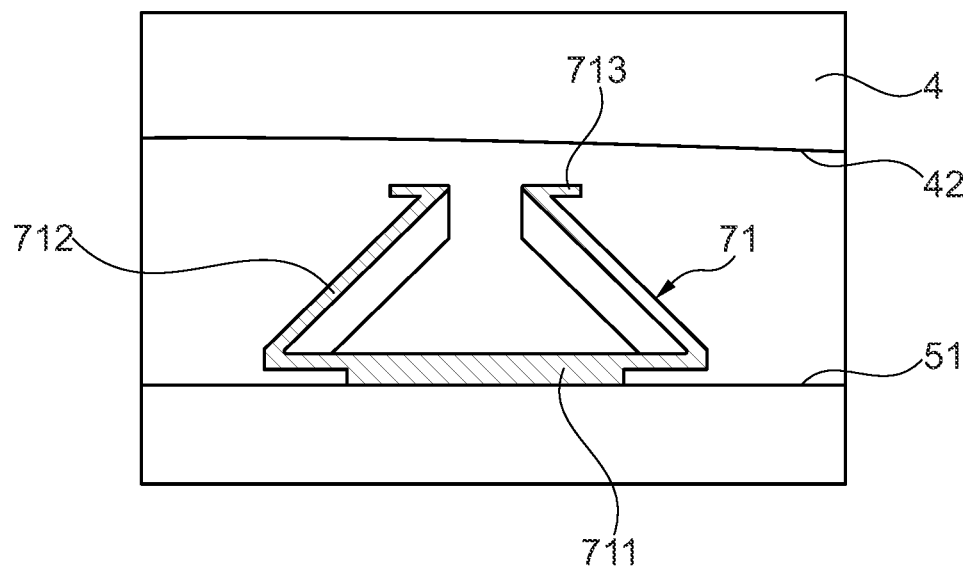
FIG. 11 is an embodiment of a dovetail slider connected to a front acoustic panel and configured to operate with the dovetail rail of FIG. 9.

FIG. 11 depicts a slider member 71 configured to form a sliding arrangement together with the dovetail rail 61 of FIG. 9, wherein the slider member 71 slides along the outer surface of the dovetail rail 61 and, from this point of view, surrounds the dovetail rail 61. The dovetail rail 61 of FIG. 9 and the dovetail slider member 71 comprise corresponding trapezoidal cross-sections. The slider member 71 forms a base 711 which is attached to the outer surface 51 of the acoustic panel by means of a bonding. The slider member 71 further comprises lateral sides or legs 712 which together with the base 711 and end pieces 713 form a trapezoid.

Figure 12:
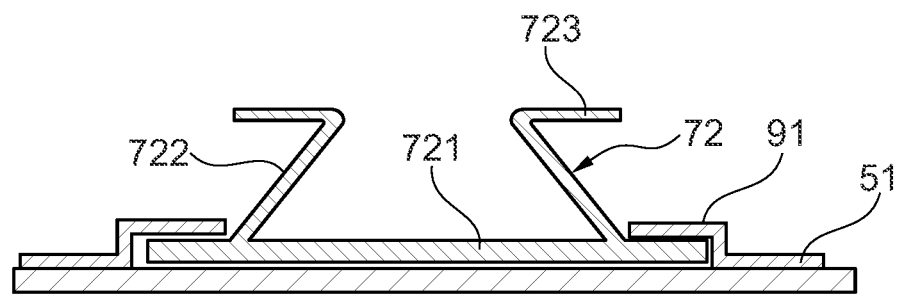
FIG. 12 is a further embodiment of a dovetail slider connected to a front acoustic panel and configured to operate with the dovetail rail of FIG. 9.

FIG. 12 shows a similar embodiment with a slider member 72 comprising a base 721, lateral sides 722 and end pieces 723 which form a trapezoid. In this embodiment, the outer surface 51 of the front acoustic panel forms a cover 91 encapsulating portions of the base 721. The cover 91 may be made by covering plies. This embodiment, compared to the embodiment of FIG. 11, eliminates the risk of a peel mode failure or debonding event.

Figure 13:
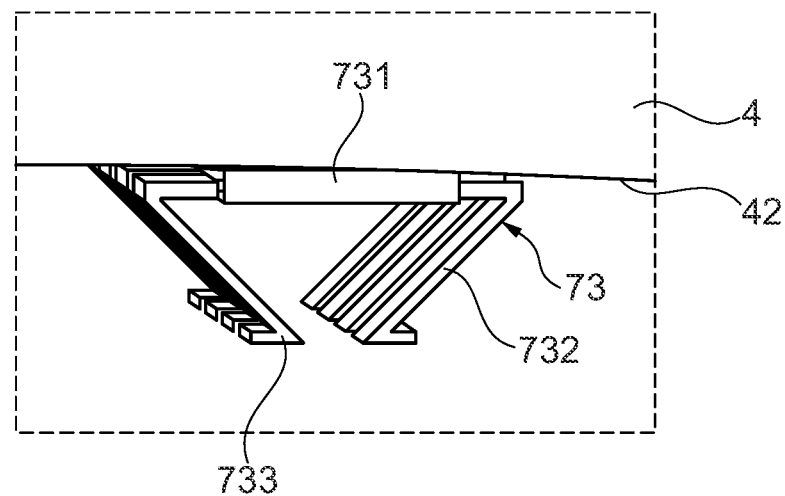
FIG. 13 is an embodiment of a dovetail slider connected to the inner surface of a fan case.
Figure 14:
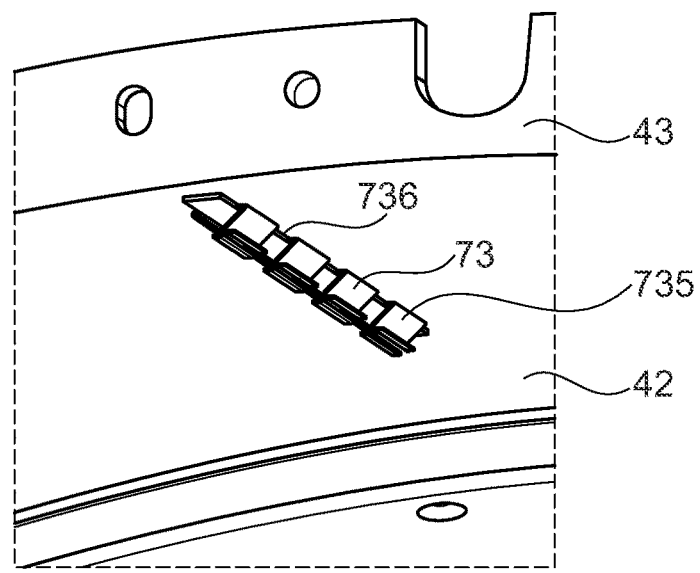
FIG. 14 is a further review of the embodiment of FIG. 13.

FIG. 13 shows an embodiment in which a slider member 73 is not attached to the front acoustic panel 5 but to the fan case inner surface 42, wherein the slider member 73 is formed as an inverse dovetail comprising a base 731, lateral sides 732 and end pieces 733. FIG. 14 is a more perspective depiction of this embodiment. As shown in FIG. 14, the slider member 73 may comprise portions 735 which are inverse dovetail-shaped and spaced in the axial direction. In the areas 736 in between, the slider member 73 may be connected to the fan case 4 by means of the screws or rivets as shown in FIGS. 7 and 8.

Figure 15:
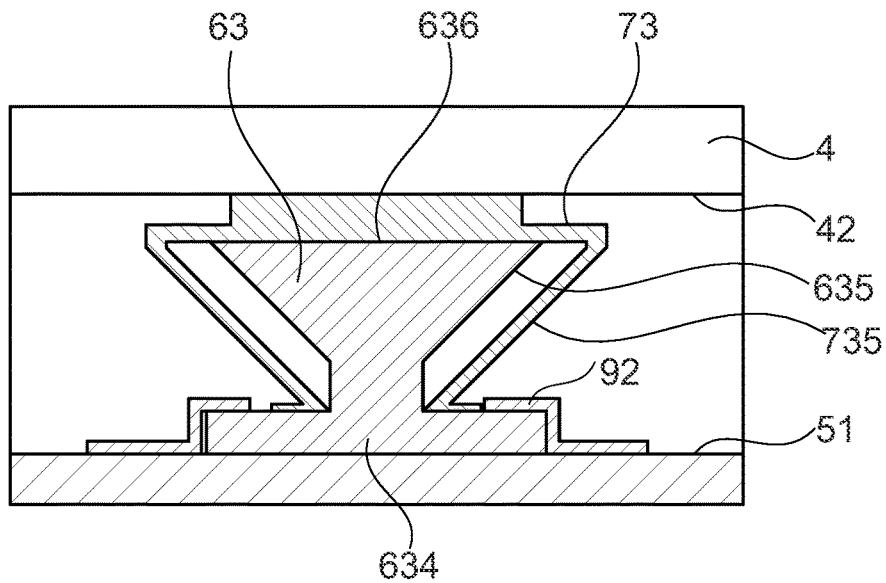
FIG. 15 is an embodiment of a dovetail rail element connected to a front acoustic panel and configured to operate with the dovetail slider of FIGS. 13 and 14.

FIG. 15 depicts a dovetail rail 63 configured to form a sliding arrangement together with the slider member 73 of FIGS. 13 and 14, wherein the dovetail rail 63 is attached to the front acoustic panel outer surface 51. The dovetail rail 63 comprises a radially inner base 634, lateral sides 635 and a radially outer base 636. The slider member 73 slides along the lateral sides 635 of the dovetail rail 63 and, from this point of view, surrounds the dovetail rail 63. Generally, the rail is the part of the sliding arrangement surrounded by or guiding the slider.

The radially inner base 634 is attached by means of a cover 92 to the outer surface 51 of the front acoustic panel. Alternatively, it could be bonded.

Figure 16:
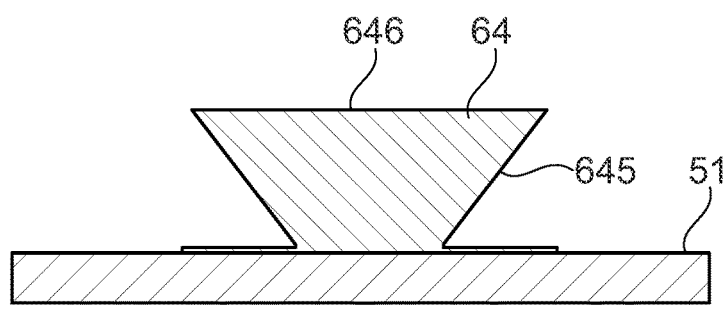
FIG. 16 is an embodiment of a dovetail rail element formed in one piece with a front acoustic panel and configured to operate with the dovetail slider of FIGS. 13 and 14.

FIG. 16 shows an embodiment in which a dovetail rail 64 with lateral sides 645 and a radially outer base 646 is formed in one piece with the front acoustic panel outer surface 51. This may be implemented by building up plies and subsequently machining a dovetail into the composite material.

Next, with respect to FIGS. 17 to 23, a plurality of embodiments is described which serve to fix the sliding arrangement formed by first and second longitudinal members which in the axial direction. The sliding movement that allows to slide the front acoustic panel 5 axially into the fan case 4 or out of the fan case 4 during assembly or disassembly requires axial fixity when the front acoustic panel 5 has been put into place.

Figure 17:
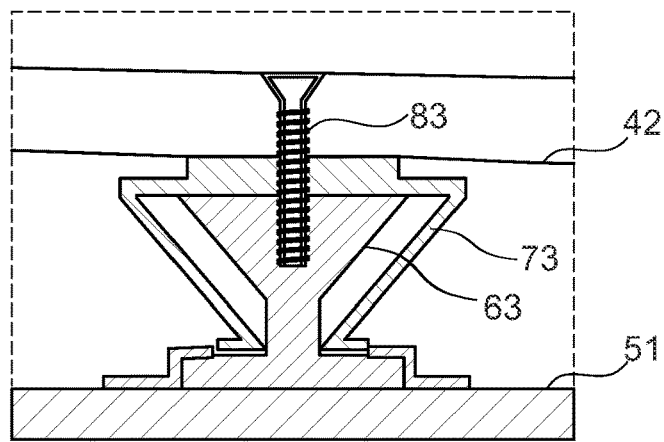
FIG. 17 is an embodiment of fastening means for fixing a sliding arrangement in the axial direction, the fastening means comprising a radial bolt.

FIG. 17 shows an embodiment which is based on the embodiment of FIG. 15. A radial screw 83 extends radially inward from the fan case 4 through holes in the slider 73 and in the dovetail rail 63. This embodiment may be implemented particularly if the slider 73 is attached to the fan case inner surface 42 and the dovetail rail 63 is attached to the front acoustic panel outer surface 51. It may be provided that the dovetail rail 63 comprises threaded through holes.

The radial screw 83 limits the axial motion. Instead of a screw 83, a pin may be used as well. Such pin may be attached to the fan case with a cover plate or similar means to capture.

Figure 18:
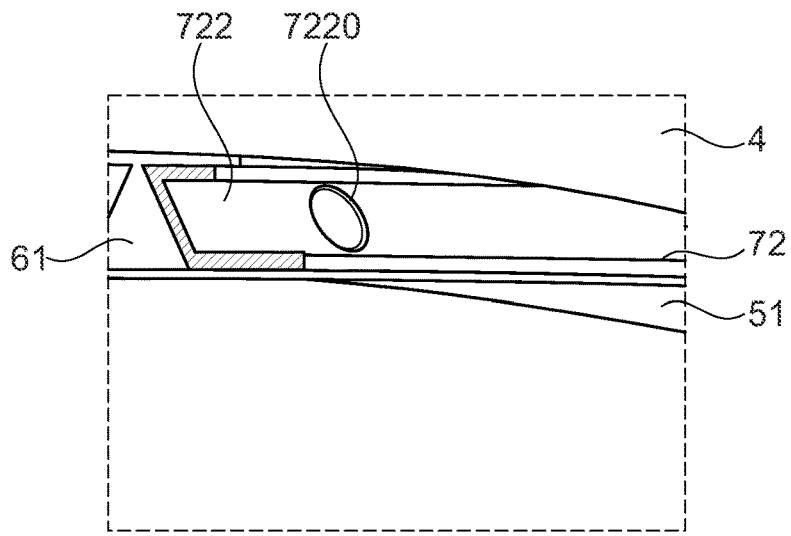
FIG. 18 is a further embodiment of fastening means for fixing a sliding arrangement in the axial direction, the fastening means comprising through holes in side strips of a dovetail slider.

FIG. 18 shows an embodiment which is based on the embodiment of FIG. 12. The slider element 72 which is attached to the front acoustic panel 5 comprises lateral sides 722 which are depicted in a perspective view in FIG. 18 and which form a form-fit in the radial direction and the circumferential direction with dovetail rail 61. At least one through hole 7220 is provided in the lateral sides 722 which allows to insert a screw or a tangential pin or the like across the rail, thereby inhibiting a relative movement between the rail and the slider element. In case a Picatinny rail is used, a clevis pin or the like may be inserted into the cross slots (FIG. 10).

Figure 19:
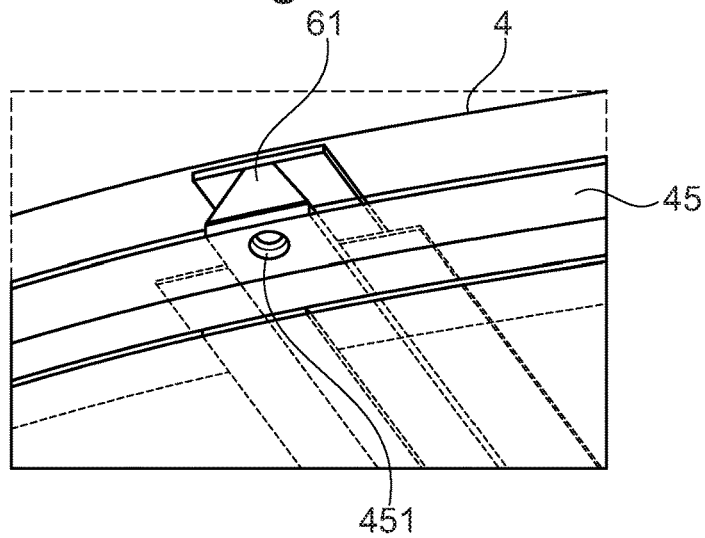
FIG. 19 is a further embodiment of fastening means for fixing a sliding arrangement in the axial direction, the fastening means comprising through holes comprised in a C-rail at the front of a fan case.

FIG. 19 depicts an embodiment in which the fan case 4 comprises a C-Rail 45 at its front for structural integrity. A through hole 451 is comprised in the C-rail 45 and allows to insert a radial screw (not shown) that radially extends through the C-rail 45, the slider element (not shown) and the dovetail rail 61.

Figure 20:
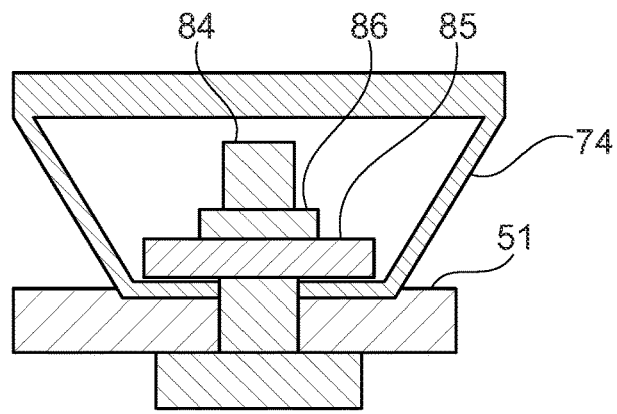
FIG. 20 is a further embodiment of fastening means for fixing a sliding arrangement in the axial direction, the fastening means comprising a radial screw configuration with a screw extending radially outward.

According to FIG. 20, a radial screw configuration is provided in a sliding arrangement which comprises a slider 74 attached to fan case (not shown). The radial screw configuration comprises a screw 84 provided from radially inside and extending through the outer surface 51, the slider 74, a washer 85 and a nut 86. This may be located at the portion or aft portion of a panel, with a dovetail rail adjacent axially to it.

Figure 21:
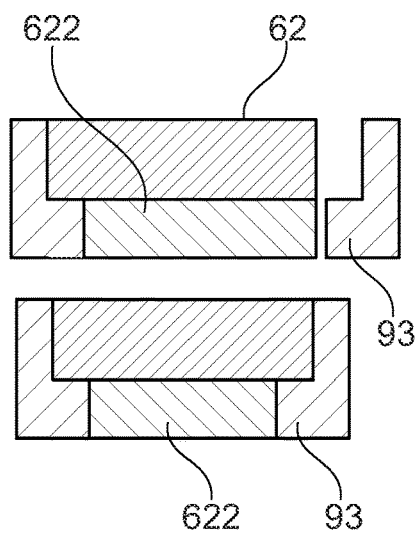
FIG. 21 is a further embodiment of fastening means for fixing a sliding arrangement in the axial direction, the fastening means comprising stop elements engaging in axial slots of a Picatinny rail as shown in FIG. 10.

FIG. 21 shows an embodiment which is suitable for providing for an axial fixation in case a Picatinny rail 62 is used (FIG. 10). A stop element 93 may be inserted into a cross slot 622 of the Picatinny rail 62.

Figure 22:
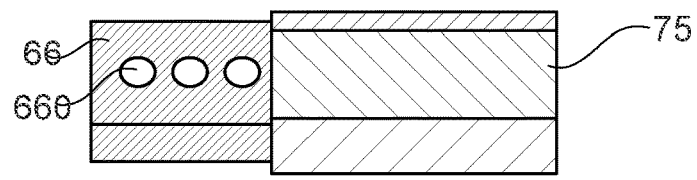
FIG. 22 shows schematically an acoustic inner panel slid on a fan case, wherein through holes are provided in a front end of the fan case.
Figure 23:
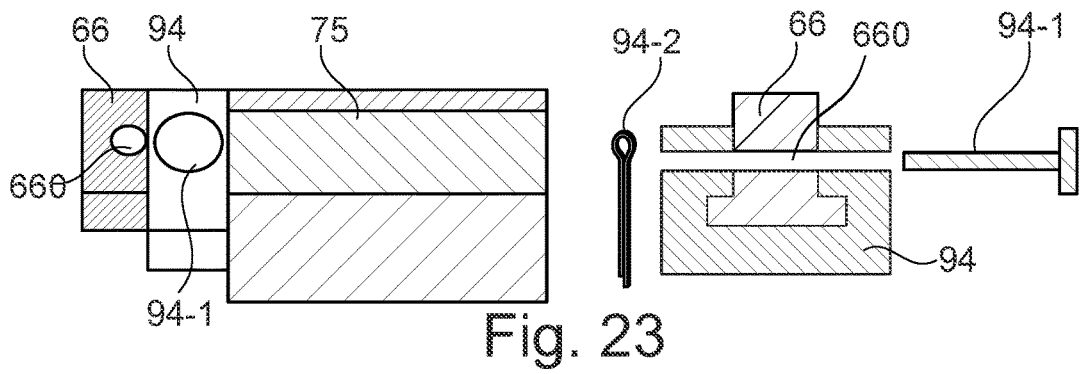
FIG. 23 is a further embodiment of fastening means for fixing a sliding arrangement in the axial direction, wherein in the embodiment of FIG. 23 the fastening means comprise a clevis spin arranged in one of the through holes, wherein FIG. 23 also shows a cross-sectional view of the clevis pin.

FIG. 22 shows schematically in a side view a front acoustic panel slider 75 slid onto a fan case mounted rail 66. The axial direction is to the right in FIG. 22. A plurality of holes 660 are provided in the rail 66 which extend in the axial direction. As shown in FIG. 23, a stop element 94 may be used to provide an axial limit to the slider 75 with a cross-rail pin or screw 94-1 inserted into one of the holes 660 (see right-hand side of FIG. 23 which is a cross-sectional view), thereby fixing the front acoustic panel slider 75 in its axial position. The stop element 94 may be secured by a clevis pin 94-1 comprising at its end a cross-hole for a cotter pin 94-2. Alternatively, for example, a threaded end block may be used to secure the front acoustic panel slider 75 and thus the front acoustic panel.

Figure 23A:
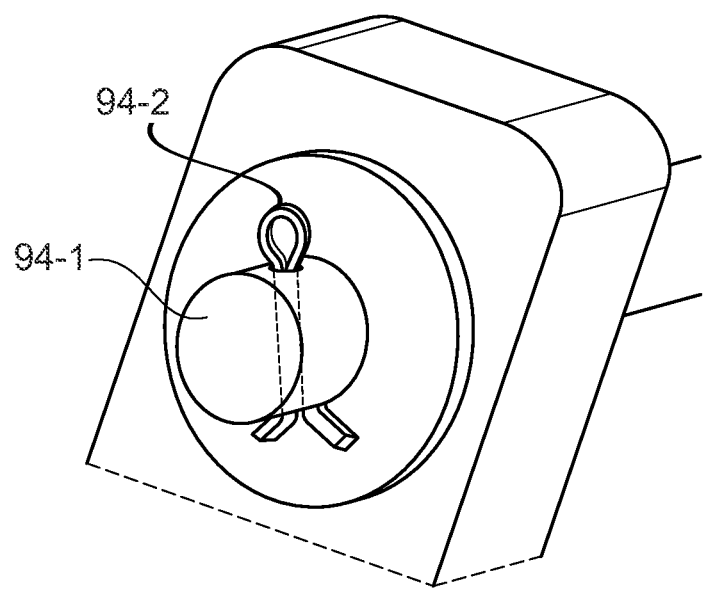
FIG. 23a is a perspective view of the embodiment of FIG. 23 showing the clevis pin secured by a cotter pin.

FIG. 23a is a perspective view of the embodiment of FIG. 23 showing the clevis pin 94-1 secured by a cotter pin 94-2.

Figure 24:
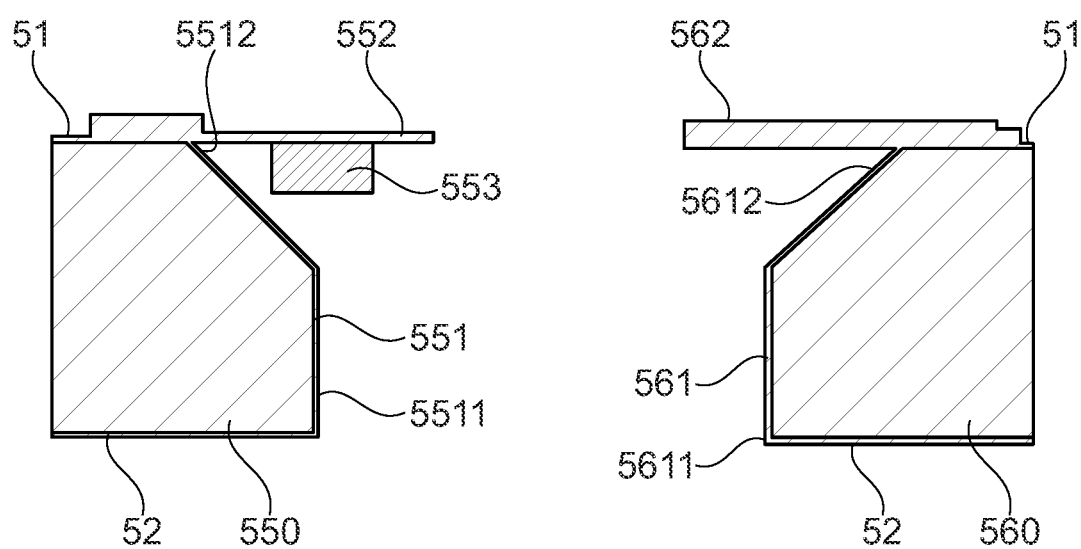
FIG. 24 is an embodiment in which two adjacent panel members each comprise a flange, wherein the adjacent panel members are shown separated from each other.
Figure 25:
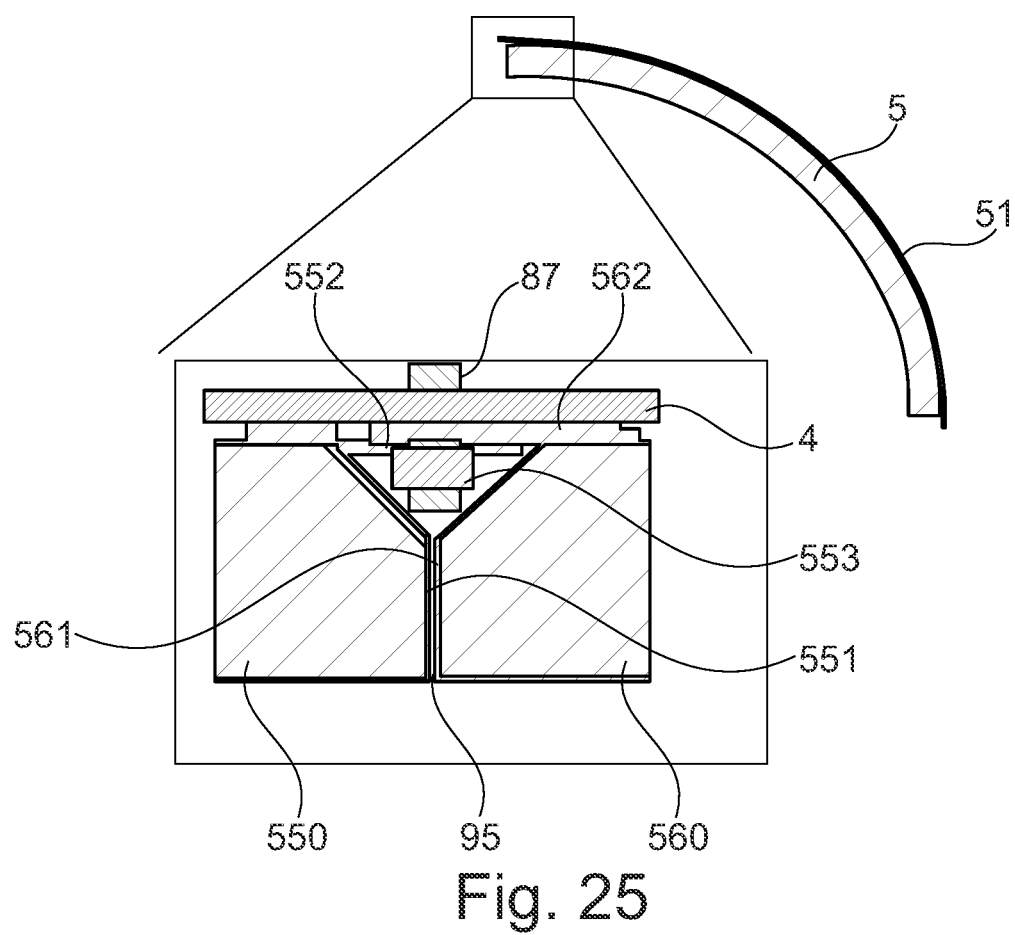
FIG. 25 shows the embodiment of FIG. 24, wherein the adjacent panel members are in the assembled state and wherein the flanges of the panel members overlap and are secured by a radial bolt.
Figure 26:
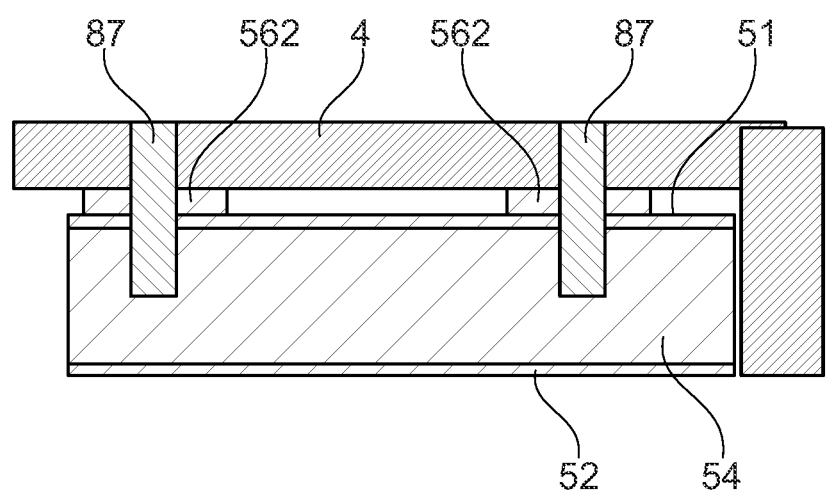
FIG. 26 shows in a sectional view the embodiment of FIG. 25.

FIGS. 24 to 26 describe an embodiment which is based on overlapping joints to secure the front acoustic panel to the fan case.

More particularly, as shown in FIG. 24, this embodiment is based on a configuration in which the front acoustic panel 5 comprises a plurality of panel members each extending in the circumferential direction, wherein the panel members are arranged adjacent to one another to form a substantially complete ring of the acoustic panel, as discussed with respect to FIG. 5. FIG. 24 shows two adjacent panel member 550, 560. Each panel member 550, 560 has first and second edges which extend axially and are spaced apart in the circumferential direction, wherein FIG. 24 depicts one such edge 551 of panel member 550 and one such edge 561 of adjacent panel member 560. The edges 551, 561 are chamfered towards the outer surface 51 to provide room for radial bolts as will be discussed with respect to FIG. 25.

The edges 551, 561 each extend in the radial direction, wherein they comprise a radially inner end 5511, 5611 and a radially outer end 5512, 5612, wherein the radially outer end 5512, 5612 ends at the outer surface 51. It is provided that each panel member 550, 560 comprises a flange 552, 562 at the radially outer end of the respective edge 551, 561, the flanges 552, 562 pointing towards each other in the circumferential direction.

At the radial inside of flange 552 a nutplate 553 is riveted.

It is to be noted that the flanges 552, 562 are offset with respect to each other in the radial direction, wherein the radial offset is equal to the height of flange 562. Further, through holes are provided in the flanges 552, 562, wherein the through hole of flange 552 is at the location of nutplate 553.

FIG. 25 shows the situation when the two flanges 552, 562 are overlapping and have been connected by means of a radial bolt 87 that extends through the nutplate 553, flange 552, flange 562 and the fan case 4. In this embodiment, no sliding arrangement is implemented.

The radial bolt 87 is assembled into the case from radially outside to lock the panel members 550, 560 into position. A gap 95 between the adjacent edges 551, 561 of panel members 550, 560 is minimal.

FIG. 26 shows a longitudinal cross-section indicating that a plurality of such connections are provided in the axial direction.

In the embodiment FIGS. 24 to 26, attachment of the front acoustic panel to the fan case is provided for at the edges of the panel elements, such that a sufficient stiffness of the panel elements is required. Alternatively, the panels could be additionally connected to the fan case 4 by other means such as a sliding arrangement as discussed with respect to FIGS. 7 to 23.

FIGS. 27 to 30 depict in cross-sectional view embodiments of the front acoustic panel in which panel members 550 have first and second edges 551 (which are distanced in the circumferential direction). The edges 551 each extend in the radial direction, wherein they are partly or fully chamfered towards the outer surface 51 (FIGS. 27, 28, 30) or comprise cut-outs (cut-out 57 in FIG. 29). The edges 551 further comprise end taps (which may also be referred to as corner tabs or lips) at their radially outer end, as discussed below. A plurality of such panel members 550 is arranged adjacent to one another to form a substantially complete ring of the acoustic panel.

Figure 27:
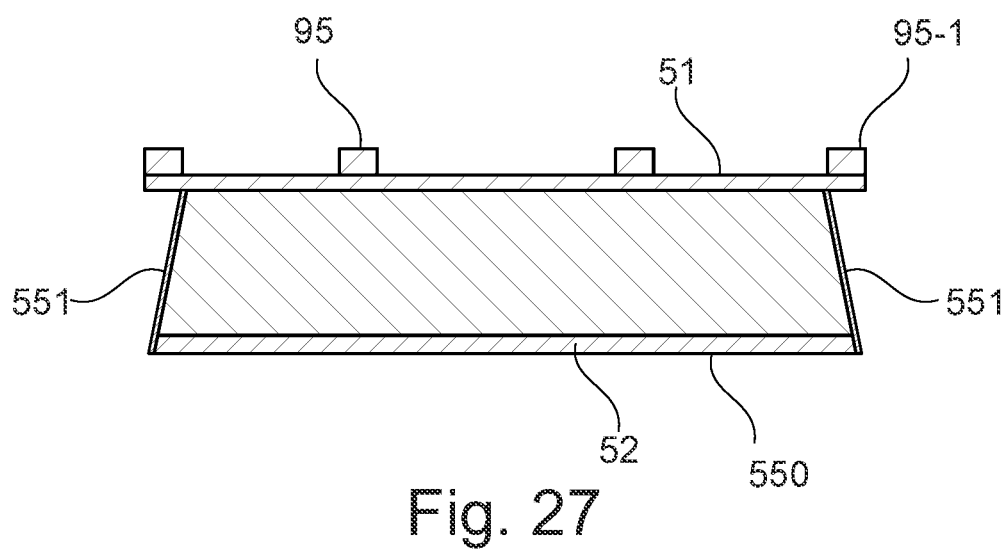
FIG. 27 is an embodiment of a front acoustic panel comprising radial spacers on the outer surface.

More particularly, in FIG. 27, radial spacers 95 are provided on the outer surface 51 of the front acoustic panel 5 to provide offset from the casing inner surface. Such radial spacers 95 could be an integral part of the outer surface 51 or represent separate elements. The radial spacers located at the edges 551 form end tabs 95-1. The end tabs 95-1 represent protrusions that extend in the circumferential direction. They serve to be held by a T-shaped or I-shaped rail connected to the fan case inner surface, as discussed with respect to FIG. 31.

Figure 28:
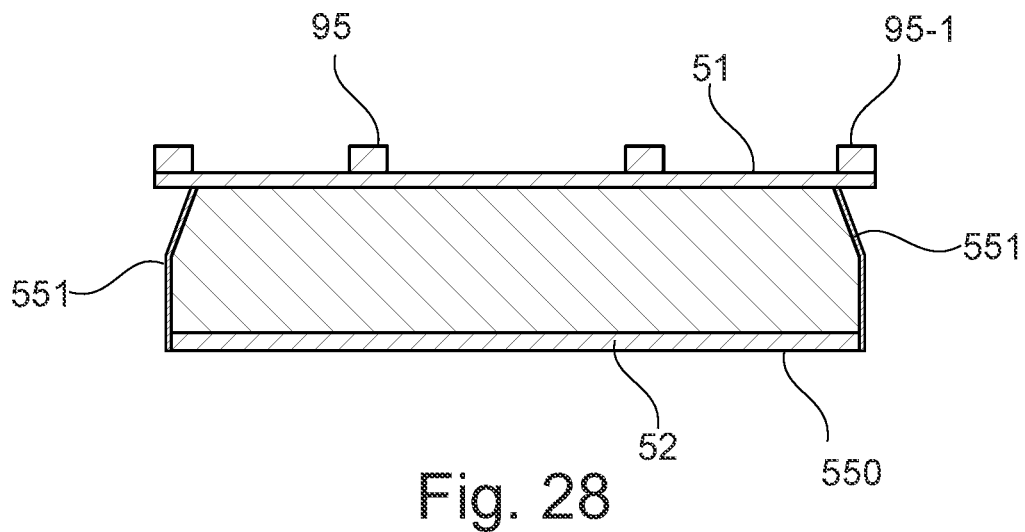
FIG. 28 is a further embodiment of a front acoustic liner comprising radial spacers on the outer surface.

The embodiment of FIG. 28 is identical to the embodiment of FIG. 27 except that the edges 551 are only partly chamfered.

Figure 29:
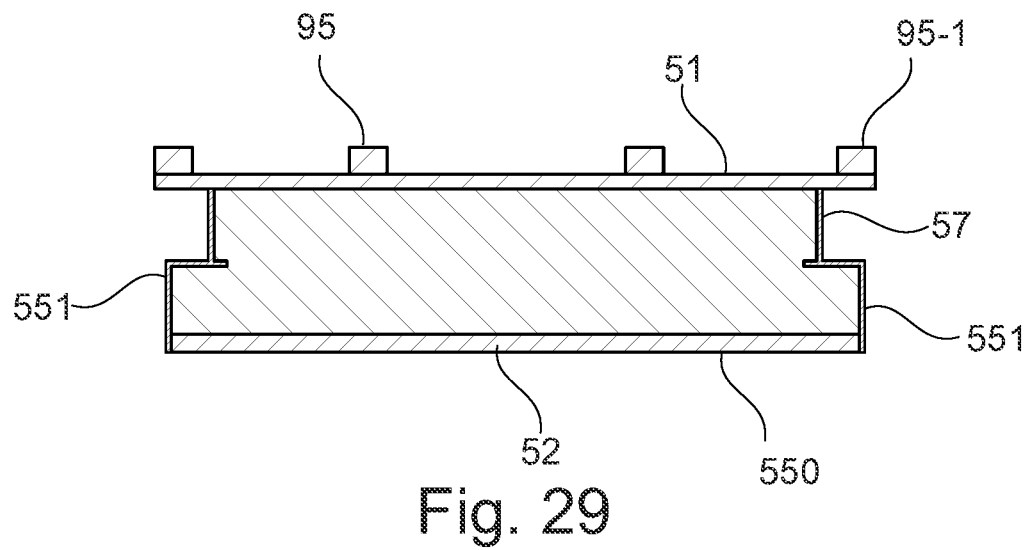
FIG. 29 is a further embodiment of a front acoustic liner comprising radial spacers on the outer surface.

The embodiment of FIG. 29 is identical to the embodiment of FIG. 27 except that the edges 551 are not chamfered but comprise a square cut-out 57 next to the outer surface 51.

Figure 30:
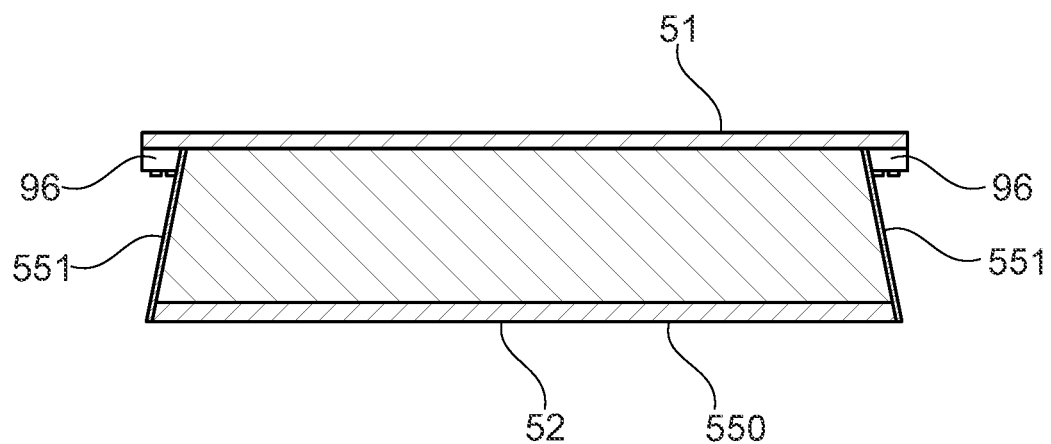
FIG. 30 is an embodiment of a front acoustic panel forming end tabs at its outer surface.

FIG. 30 depicts an embodiment of panel members 550 in which end tabs 96 are integrated to the inside of the outer surface 51. They may be produced integral with the outer surface 51. Alternatively, they may be produced integral with the end caps (FIG. 5) or combination of the inner skin and end caps. The embodiment of FIG. 30 allows the panel inner surface to be nearly continuous between adjacent panel members while the end tabs 96 allow sliding into shelf at the outer surface of the panel.

Figure 31:
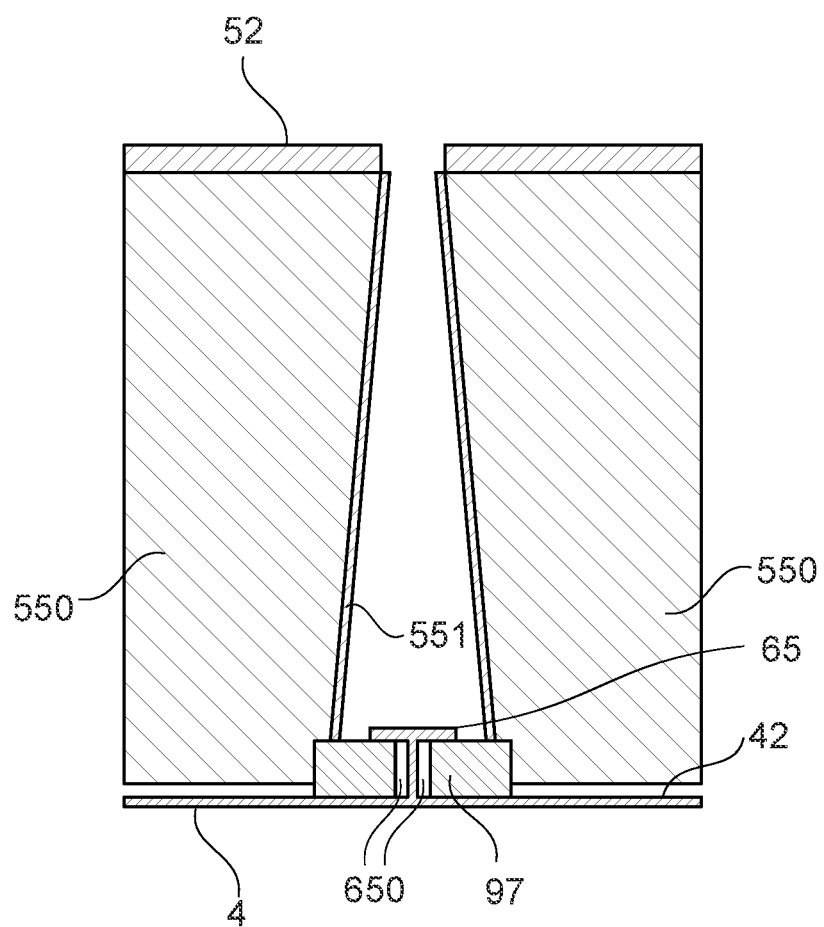
FIG. 31 is an embodiment of a fan case assembly having a fan case and a front acoustic panel, wherein a T-shaped beam is attached to the fan case inner surface and acoustic panel members are held at their edges in the T-shaped beam.

FIG. 31 an embodiment of a fan case assembly having a fan case 4 and a front acoustic panel comprised of a plurality of panel members 550 arranged adjacent to one another in the circumferential direction, wherein a T-shaped or I-shaped beam 65 is attached to the fan case inner surface 42 and the acoustic panel members 550 are held at their edges in the beam 65. More particularly, end tabs 97 of the panel members 550 (similar to end tabs 95-1, 96 of panel members 550 of FIGS. 27-30) serve to attach the panel members 550 to the T-shaped or I-shaped beam 65 and to guide the panel members 550 along the beam 65 during assembly and disassembly. The beam 65 forms two in cross-sectional view rectangular grooves 650 that are axially extending at each side of the beam 65, each groove 650 receiving an end tab 97.

The end tabs 97 may be continuous in the axial direction or comprise a plurality of individual tabs spaced in the axial direction.

Removable fastening means such as radial bolts may be provided for to fix the panel members 550 with respect to the beam 65 in the axial direction in a similar manner as discussed above.

The beam 65 represents an embodiment of a rail. Each end tab 97 represents a slider sliding along the rail 65 (namely, in groove 650 of rail 65), such that the embodiment of FIG. 31 is another embodiment of a sliding arrangement.

It should be understood that the above description is intended for illustrative purposes only and is not intended to limit the scope of the present disclosure in any way. Also, those skilled in the art will appreciate that other aspects of the disclosure can be obtained from a study of the drawings, the disclosure and the appended claims. All methods described herein can be performed in any suitable order unless otherwise indicated herein or otherwise clearly contradicted by context. Various features of the various embodiments disclosed herein can be combined in different combinations to create new embodiments within the scope of the present disclosure. In particular, the disclosure extends to and includes all combinations and sub-combinations of one or more features described herein. Any ranges given herein include any and all specific values within the range and any and all sub-ranges within the given range.

The invention claimed is:

1. A fan case assembly for a gas turbine engine, the fan case assembly comprising:
    a fan case having an inner surface and an outer surface;
    a front acoustic panel having an outer surface; and
    attachment means attaching the front acoustic panel outer surface to the fan case inner surface, the attachment means comprising a sliding arrangement allowing the front acoustic panel to be slid axially into the fan case;
    the sliding arrangement comprising a first longitudinal member and a second longitudinal member, one of the first and second longitudinal members being attached to the fan case inner surface and the other of the first and second longitudinal members being attached to the front acoustic panel outer surface;
    the attachment means further comprising removable fastening means fixing the first longitudinal member and the second longitudinal member in an axial direction.

2. The fan case assembly of claim 1, wherein an axial row of screws or rivets extends from the fan case outer surface radially inward, the screws or rivets securing one of the first and second longitudinal members to the fan case inner surface.

3. The fan case assembly of claim 1, wherein the sliding arrangement comprises a rail as the first longitudinal member and a corresponding slider element as the second longitudinal member.

4. The fan case assembly of claim 3, wherein the rail is attached to the fan case inner surface.

5. The fan case assembly of claim 3, wherein the slider element is attached to the fan case inner surface.

6. The fan case assembly of claim 3, wherein the rail is attached to or formed in one piece with the front acoustic panel outer surface.

7. The fan case assembly of claim 6, wherein the rail is attached to the front acoustic panel outer surface by bonding or by encapsulation of a portion of the rail.

8. The fan case assembly of claim 1, wherein the slider element is attached to the front acoustic panel outer surface.

9. The fan case assembly of claim 8, wherein the slider element is attached to the front acoustic panel outer surface by bonding or by encapsulation of a portion of the slider element.

10. The fan case assembly of claim 1, wherein the first longitudinal member and/or the second longitudinal member comprise serrated or separated portions spaced in the axial direction.

11. The fan case assembly of claim 1, wherein the removable fastening means fixing the first longitudinal member and the second longitudinal manner in the axial direction comprise a radial bolt or pin extending radially inwards from the fan case into through holes in the first and second longitudinal members.

12. The fan case assembly of claim 1, wherein the fan case further comprises a C-rail at a front end of the fan case, and wherein the removable fastening means fixing the first longitudinal member and the second longitudinal manner in the axial direction comprise a radial screw that radially extends at least through a hole in the C-rail and the front ends of the first and second longitudinal members.

13. The fan case assembly of claim 1, wherein the removable fastening means fixing the first longitudinal member and the second longitudinal manner in the axial direction comprise a bolt, screw or pin extending tangentially from the second longitudinal member into the first longitudinal member.

14. The fan case assembly of claim 1, wherein the removable fastening means fixing the first longitudinal member and the second longitudinal manner in the axial direction comprise a stop element secured to the fan case adjacent a front end of the front acoustic panel.

15. The fan case assembly of claim 1, wherein the front acoustic panel comprises a plurality of panel members each extending over a defined angle in a circumferential direction, the panel members being arranged adjacent to one another to form a substantially complete ring of the acoustic panel, and each of the panel members having first and second edges extending axially and spaced apart in the circumferential direction.

16. A fan case assembly for a gas turbine engine, the fan case assembly comprising:
a fan case having an inner surface and an outer surface;
a front acoustic panel having an outer surface, the front acoustic panel comprising a plurality of panel members each extending in a circumferential direction, the panel members being arranged adjacent to one another to form a substantially complete ring of the acoustic panel, and each of the panel members having first and second edges extending axially and spaced apart in the circumferential direction, each of the first and second edges having a radially outer end at the front acoustic panel outer surface and adjacent the fan case inner surface;
wherein each of the panel members comprises a first flange at the radially outer end of the first edge and a second flange at the radially outer end of the second edge, the first flange being radially offset to the second flange;
wherein with adjacent ones of the panel members, the first flange of one panel member and the second flange of the other panel member overlap in the circumferential direction;
wherein an axial row of radially extending bolts or screws secures the first and second flanges of the adjacent ones of the panel members with each other and with the fan case, the bolts or screws extending from the fan case radially through the first and second flanges.

17. The fan case assembly of claim 16, wherein a radial offset of the first flange with respect to the second flange is equal to a height of the second flange.

18. The fan case assembly of claim 16, wherein the first and second edges of each of the panel members are chamfered or have a square cut-out towards the acoustic panel member outer surface.

19. The fan case assembly of claim 16, wherein axially spaced nut plates are riveted or bonded on the radial inner side of the second flange, the nut plates accommodating the bolts or screws.

20. The fan case assembly of claim 16, wherein through holes are comprised in the first flange and in the second flange which are aligned in a fully installed state.

21. A fan case assembly for a gas turbine engine, the fan case assembly comprising:
a fan case having an inner surface and an outer surface;
a front acoustic panel having an outer surface, the front acoustic panel comprising a plurality of panel members each extending in a circumferential direction, the panel members being arranged adjacent to one another to form a substantially complete ring of the acoustic panel, and each of the panel members having first and second edges extending axially and spaced apart in the circumferential direction, each edge of the first and second edges having a radially outer end at the front acoustic panel outer surface and adjacent the fan case inner surface, and each of the first and second edges forming at the radially outer end a protrusion extending in the circumferential direction;
attachment means attaching the front acoustic panel outer surface to the fan case inner surface, the attachment means comprising a sliding arrangement allowing the front acoustic panel to be slid axially into the fan case;
the sliding arrangement comprising beams attached to the fan case inner surface, each of the beams extending axially at a circumferential position that lies between two adjacent ones of the panel members and forming two axially extending grooves, and the sliding arrangement further comprising the protrusions formed at the panel member edges outer ends, wherein each of the protrusions is arranged in a beam groove.

22. The fan case assembly of claim 21, wherein at least one of the beams is a T-shaped beam or an I-shaped beam.

23. The fan case assembly of claim 21, wherein the first and second edges of each of the panel members are chamfered or have a square cut-out towards the acoustic panel member outer surface.

\* \* \* \* \*